United States Patent [19]

Moriguchi et al.

[11] Patent Number: 4,568,948

[45] Date of Patent: Feb. 4, 1986

[54] DRIVING SYSTEM FOR THERMAL RECORDING HEAD

[75] Inventors: Haruhiko Moriguchi; Takashi Ohmori, both of Kanagawa, Japan

[73] Assignee: Fuji Xerox Company Limited, Tokyo, Japan

[21] Appl. No.: 357,937

[22] Filed: Mar. 15, 1982

[30] Foreign Application Priority Data

Mar. 16, 1981 [JP] Japan ............................ 56-36499[U]

[51] Int. Cl.⁴ ........................ G01D 15/10; H05B 1/00

[52] U.S. Cl. ............................... 346/76 PH; 346/1.1; 219/216

[58] Field of Search ........................... 346/76 PH, 1.1; 219/216

[56] References Cited

U.S. PATENT DOCUMENTS

| | | | |
|---|---|---|---|
| 4,071,849 | 1/1978 | Koyano et al. | 346/76 PH X |
| 4,149,171 | 4/1979 | Sato et al. | 346/76 PH X |
| 4,368,491 | 1/1983 | Saito | 346/76 PH X |
| 4,401,993 | 8/1983 | Moriguchi et al. | 346/76 PH |

*Primary Examiner*—George H. Miller, Jr.

*Attorney, Agent, or Firm*—Sughrue, Mion, Zinn, Macpeak & Seas

[57] ABSTRACT

A thermal recording head is provided with a driving system wherein higher printing speeds may be obtained. Particularly, in the case where the image to be printed by a divided block of elements is totally black, all common driving terminals corresponding to the block are selected for simultaneous recording.

10 Claims, 5 Drawing Figures

DRIVING SYSTEM FOR THERMAL RECORDING HEAD

BACKGROUND OF THE INVENTION

The present invention relates to a driving system for a thermal recording head, in which common driving electrodes and individual lead electrodes are arranged across a continuous heating unit, and more particularly to a driving system for a thermal recording head intended for high-speed driving.

A conventional thermal recording head for which a common driving electrode and individual lead electrodes are arranged alternately across a continuous heating unit will be represented, for example, by the structure shown in FIG. 1. In this drawing, 1 denotes a support substrate, 2 a continuous heating unit, 3 a common driving electrode, 4 an individual lead electrode, 5 common driving lead wiring, 6A, 6B reverse current stopping elements, 7 matrix driving lead wiring, 8 a common driving terminal, and 9 an individual lead terminal.

Such a driving system for a thermal recording head is disclosed in Japanese Patent Publications Laid-Open No. 51-94940, No. 51-115839, and No. 51-81137. To attain high-speed driving, methods wherein (1) the excitation pulse width for driving each heating element is shortened, and (2) the number of heating elements driven concurrently is increased to accelerate the processing speed of one line, are disclosed in the above publications. Further, in Japanese Patent Publication Laid-Open No. 52-10018, there is disclosed a method of obtaining high-speed driving by (3) skipping a white block.

SUMMARY OF THE INVENTION

An object of the present invention is to provide a new high-speed driving system for use with a thermal recording head.

In a driving system for a thermal recording head for heating a desired heating resistor selectively by selecting a common driving terminal and an individual driving terminal, in the present invention, in the case where a picture corresponding to a block divided by the common driving terminal is totally black, the plurality of common driving terminals connected to the totally-black block are concurrently selected for recording.

DETAILED DESCRIPTION OF THE PREFERRED EMBODIMENTS

Figure 1:
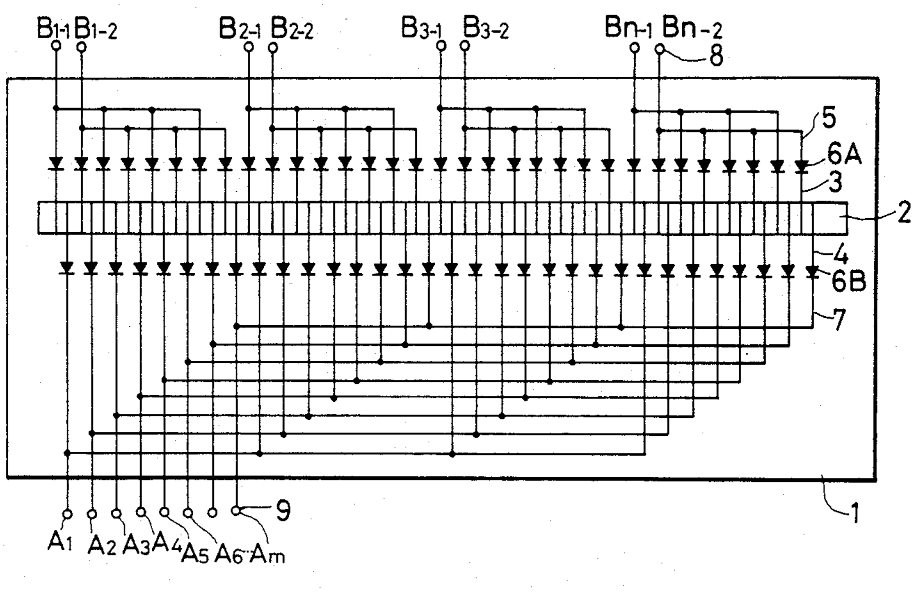
FIG. 1 PRIOR ART
FIG. 1 is a circuit diagram of a conventional thermal recording head.
Figure 2:
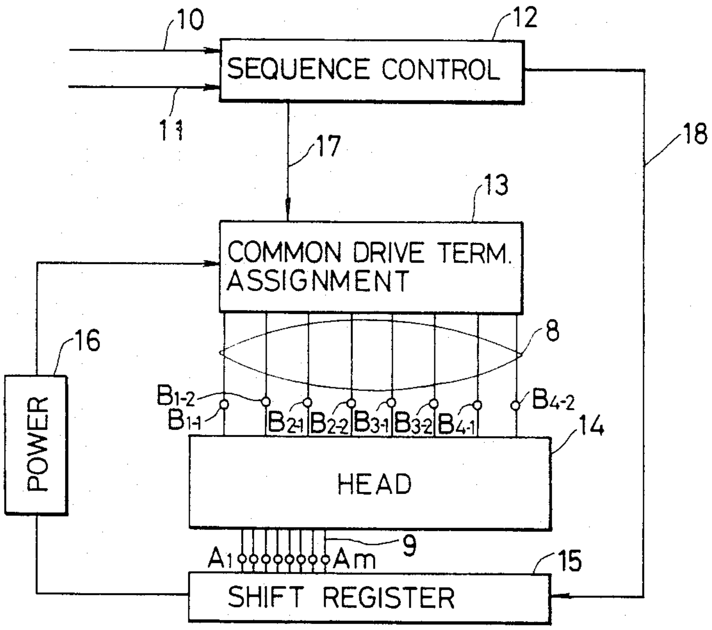
FIG. 2 is a block diagram of one preferred embodiment of the invention.

FIG. 2 represents one preferred embodiment of the invention, wherein 10 denotes a video signal, 11 a synchronizing signal, 12 a sequence controller, 13 a common driving terminal assignment driver, 14 a thermal head, 15 a shift register, 16 a power supply, 17 a common driving assignment signal, and 18 a picture signal. Other symbols and reference characters in FIG. 2 denote like elements as in FIG. 1.

The video signal 10, which contains picture information, coming from the transmission side is inputted to the sequence controller 12 together with the sychronizing signal 11. The sequence controller 12 outputs a common driving assignment signal 17, which specifies the driving timing of the common driving terminal 8, to the common driving terminal assignment driver 13, and the picture signal 18 corresponding to each common driving terminal 8 is outputted to the shift register 15 selectively synchronously therewith. Then, the sequence controller 12 decides whether or not the picture is totally black at each block.

In the case where the picture pattern is an ordinary one which is not totally black, recording is carried out by a generally-known method. However, when there occurs a totally-black block, two common driving terminals $B_{1\text{-}1}$, $B_{1\text{-}2}$, for example, of the same block are driven concurrently by the common driving assignment signal 17 outputted from the sequence controller 12. A total black signal is further outputted from the sequence controller 12 to the shift register 15. One block of the thermal head 14 is thus recorded totally black in one time operation.

Figure 3:
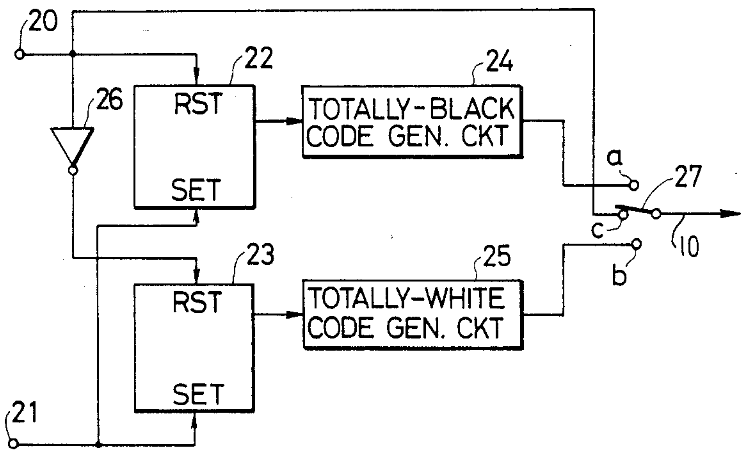
FIG. 3 is a block diagram representing one operative example of a totally-black/totally-white block signal generator.

One operative example of a totally-black/totally-white block signal generator will now be described per FIG. 3. In the drawing, RS flip-flops 22, 23 are set at the starting point of the block by a block start signal 21. Then, transmitted picture information 20 is inputted successively to a reset terminal of the RS flip-flop 22 and concurrently to a reset terminal of the RS flip-flop 23, through an inverter 26. If white and black signals are mixed in the transmitted picture information 20 for one block, the RS flip-flop 22 is reset, for example, by the white signal, and the RS flip-flop 23 is reset by the black signal. However, when the transmitted picture information for one block is totally black, then the RS flip-flop 22 is not reset. A totally-black code generating circuit 24 detects this fact and a totally-black code signal for the block consisting, for example, of six pulses is output and a switch 27 is switched to terminal "a". Thus the totally-black block code signal is transmitted to the receiving side as the video signal 10. On the other hand, when the transmitted picture information is totally white for one block, the RS flip-flop 23 is not reset, and this is detected by a totally-white code generating circuit 25, which outputs a totally-white code signal as the video signal 10 to the block and transfers the switch 27 to the terminal "b". When the white signal and the black signal are mixed in the transmitted picture information 20 for one block, the switch 27 is connected to the terminal "c", and it goes without saying that the transmitted picture information 20 is transmitted as the video signal 10 to the receiving side as hitherto.

Figure 4:
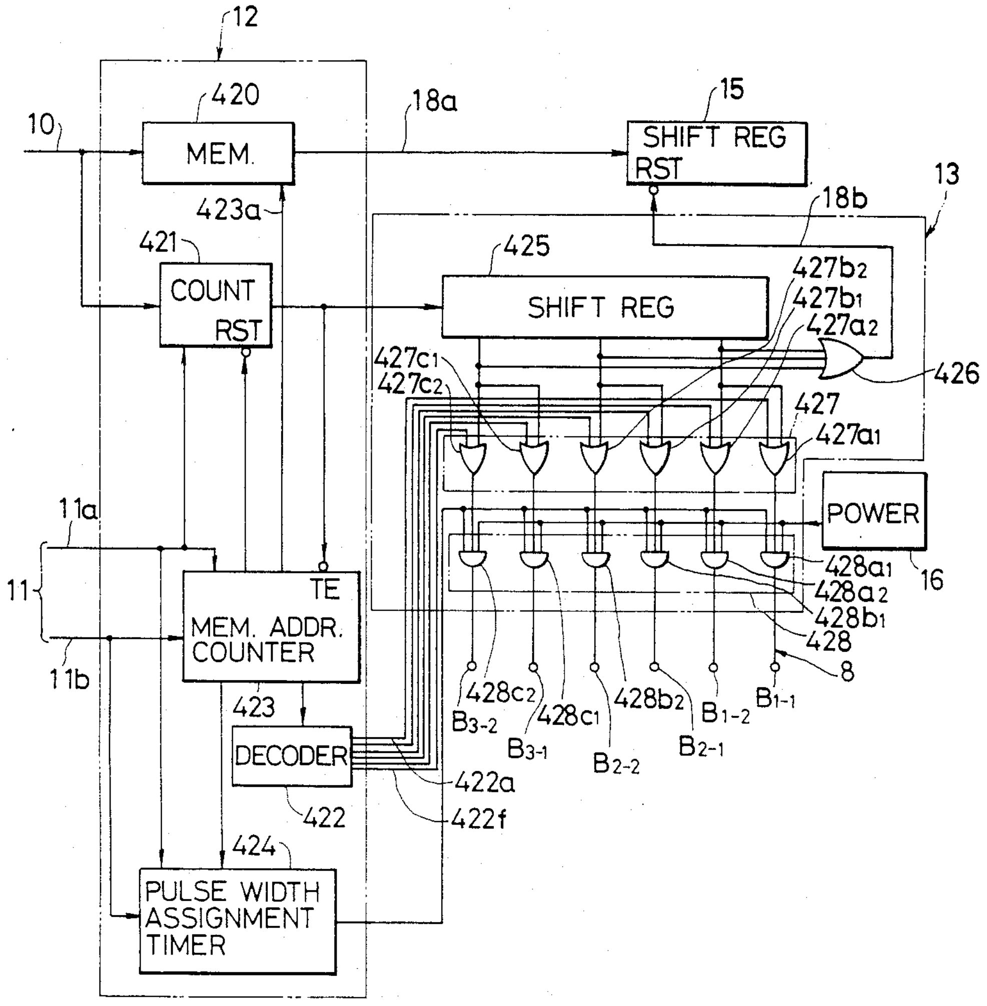
FIG. 4 is a block diagram representing one operative example of a sequence controller and common driving terminal assignment driver.

Next, the sequence controller 12 and the common driving terminal assignment driver 13 will be described with reference to FIG 4. In the drawing, 420 denotes a memory, 421 a counter, 422 a decoder, 423 a memory address counter, 424 a pulse width assignment timer, 425 a shift register, 426 an OR circuit, and 427 an OR circuit group. Other symbols and reference characters denote elements from FIG. 2. FIG. 4 represents an example of the case where the thermal head is divided into three blocks.

In the above circuit, the video signal 10 coming from the totally-black/totally-white block signal generator of FIG. 2 may include the totally-black code signal for one block coming in, for example, 6 pulses other than the picture signal. The counter 421 is thus a 6-bit counter, so that when an input signal comes in 6 bits, it generates a high level output signal. The synchronizing signal 11 is constituted of a video bit synchronizing signal 11*a* and a line synchronizing signal 11*b*. The memory 420 is controlled by a memory actuating signal 423*a* outputted from the memory address counter 423.

The operation of the above circuit will now be described. The synchronizing signal 11 is transmitted from the transmission side together with the video signal 10. When the totally-black code signal for one block, consisting of 6 pulses in the video signal 10, is inputted, the counter 421 counts it synchronously with the video bit synchronizing signal 11*a*. When the counter 421 detects the 6-bit signal, an H level output signal is output from the counter 421 to the shift register 425. On the other hand, this output signal also inhibits a trip enable terminal TE of the memory address counter 423 to prevent address counting. Consequently, the memory 420 does not take in the video signal. After the 6-bit counting operation, the counter 421 is reset by a command of the memory address counter 423, to thus prepare to discriminate whether or not the next block is totally black.

If the video signal of the next block is not totally black, the output of the counter 421 is at the L level, and simultaneously with the L level being inputted to the shift register 425, the TE terminal of the memory address counter 423 is enabled. Thus the memory 420 stores the video signal of a given number of bits according to the memory actuating signal 423*a* coming from the memory address counter 423.

Now, for example, if a totally-black block alternates with an ordinary block, signals are recorded in the shift register 425 in the order H, L, H. Thus, a signal of the H level is outputted from the OR circuit 426, the shift register 15 is reset, and a high level signal corresponding to the totally-black signal is transmitted to the individual lead terminal 9 (FIG. 2). On the other hand, the H output signal from the shift register 425 enters AND circuits $\mathbf{428}_{a1}$, $\mathbf{428}_{a2}$, $\mathbf{428}_{c1}$, $\mathbf{428}_{c2}$ of an AND circuit group 428 by way of OR circuits $\mathbf{427}_{a1}$, $\mathbf{427}_{a2}$, $\mathbf{427}_{c1}$, $\mathbf{427}_{c2}$ of the OR circuit group 427. In this case, a pulse having a time width required for total black recording is outputted from the pulse width assignment timer 424, and the AND circuits $\mathbf{428}_{a1}$, $\mathbf{428}_{a2}$, $\mathbf{428}_{c1}$, $\mathbf{428}_{c2}$ are opened for a given period of time specified by said pulse. The power supply 16 is thereby connected to the common driving terminals $B_{1-1}$, $B_{1-2}$, $B_{3-1}$, $B_{3-2}$.

Power is therefore supplied to the selected common driving terminals $B_{1-1}$, $B_{1-2}$, $B_{3-1}$, $B_{3-2}$ in FIG. 1 or 2 from the power supply 16, and a high level signal to draw in the voltage impressed on the selected common driving terminals is applied, as described above, to the individual lead terminals 9 from the shift register 15, whereby a block can be recorded in black concurrently.

When the video signal 10 does not include a totally-black code signal for one block, the counter 421 generates a low level output. Therefore, an L level signal is stored in the shift register 425, and hence the shift register 15 is not reset by an output from the shift register 425. Video information stored in the memory 420 is consequently stored in sequence in the shift register 15. Thus, a signal of H level will not be output from the OR circuit group 427 according to the output of the shift register 425. On the other hand, the decoder 422 successively supplies a positive pulse of a given width to the OR circuit group 427 through lines 422*a*–422*f* according to a command from the memory address counter 423. Thus, the positive pulse is applied in sequence to the input terminals on one side of AND circuits $\mathbf{28}_{a1}$, $\mathbf{28}_{a2}$, . . . $\mathbf{28}_{c2}$. A signal of the necessary pulse time width for thermal recording is outputted from the pulse width assignment timer 424 synchronously with the output of the decoder 422. The AND circuits $\mathbf{428}_{a1}$, $\mathbf{428}_{a2}$, . . . $\mathbf{428}_{c2}$ are opened in sequence accordingly, and the power supply 16 is connected in sequence to the common driving terminals $B_{1-1}$, $B_{1-2}$, . . . $B_{3-2}$.

Then, the video signal is impressed upon the individual lead terminals 9 from the shift register 15 synchronously therewith, and hence a picture corresponding to the video signal is recorded by the thermal head 14.

As described, in the embodiment, the two common driving terminals in the same block are ready for concurrent driving for a totally-black block, and therefore the recording time of a totally-black block can be shortened to one-half that of a conventional system. Namely, assuming the time for selecting one common driving terminal is 4 m sec. in the case of an ordinary pattern, the conventional system selects two common driving terminals in sequence even if the block is totally black, thus requiring 8 m sec. therefore. However, the present embodiment is effective to shorten this recording time to 4 m sec., half of the conventional time.

Figure 5:
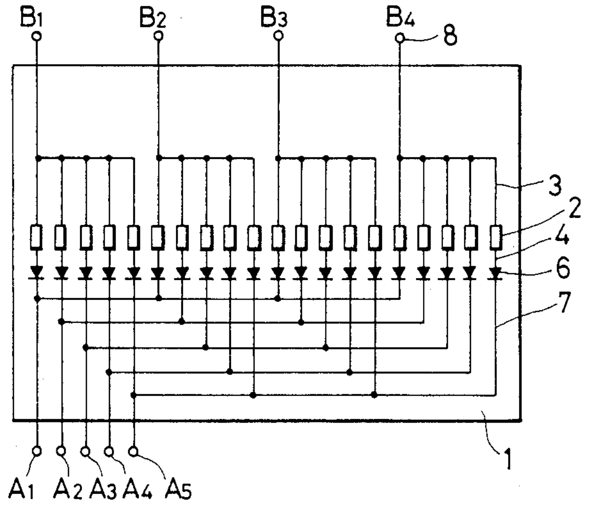
FIG. 5 is a circuit diagram of another conventional type thermal recording head.

In the above embodiment, a thermal head using a continuous heating resistor was used for description, however, the present invention applies likewise to a thermal head in which the heating resistors are separated, as shown in FIG. 5.

Namely, each common driving terminal 8 is made to correspond to the above-mentioned block, so that the recording time can be shortened, as in the case of the above embodiment, by selecting corresponding common driving terminals when successive blocks are totally black. The elements numbered in FIG. 5 correspond to like elements in FIG. 1.

Further, according to the invention, two common driving terminals in the same block are driven concurrently when one block is totally black, thereby shortening the recording time of totally black blocks. Moreover, the recording time will be likewise shortened in the case of totally white blocks, and thus the total recording time on the thermal recording head can be further shortened by using both at the same time.

According to the present invention, as described, the arrangement is such that a plurality of common driving terminals are selected concurrently for the same block in the case where the picture corresponding to the block divided by the common driving terminal is totally black, and therefore the recording time can be shortened. Furthermore, the electric energy to be impressed on the heating unit can be minimized as compared with the conventional system wherein the same block is divided and operated twice for recording. Finally, a uniform recording density is obtainable according to the invention.

What is claimed is:

1. A driving system for a thermal recording head, wherein a heating unit includes a plurality of heating elements selectively energized by selecting a common driving terminal and by selecting in response to image data to be recorded an individual terminal, comprising means for detecting when an image to be printed corresponding to a block of elements divided by common driving terminals is totally black, and means for selecting a plurality of common driving terminals assigned to said totally black block for simultaneous recording, in response to said detection, said common driving terminals not being simultaneously selected when said image is not totally black.

2. A driving system as claimed in claim 1, said switching means comprising first and second logic elements arranged so as to be reset by white or black image information, respectively, and means for outputting said black block signal and a white block signal when said first and second logic elements are not reset by said input image information, respectively.

3. A driving system as claimed in claim 1, said selecting means comprising sequence control means and common terminal assignment means.

4. A driving system as claimed in claim 1, further comprising means detecting when an image to be printed corresponding to a block of elements is totally white.

5. A driving system as claimed in claim 1, said detecting means comprising switching means receiving input image information, said switching means outputting either said input image information or at least a black block signal.

6. A driving system as claimed in claim 5, said selecting means comprising sequence control means receiving said input image information and said black block signal, said selecting means including memory means for storing information input thereto, and memory address counter means controlling storing in said memory means.

7. A driving system as claimed in claim 6, further including counter means for discriminating said black block signal and for inhibiting said memory address counter in response thereto.

8. A driving system as claimed in claim 7, an output of said counter being applied to shift register means, said counter outtputting a first signal when said black block signal is discriminated, and a second signal if not, an output of said shift register being applied via gate means to said recording head.

9. A driving system as claimed in claim 8, wherein, upon receiving at least one said first signal from said counter, said shift register output operates to reset further shift register means, and selects, via said gate means, a plurality of common driving terminals corresponding to said totally black block, for simultaneous recording.

10. A driving method for use with a thermal recording head, comprising detecting when an image to be printed corresponding to a block divided by common driving terminals is totally black and driven by individual terminals, and selecting a plurality of said common driving terminals and a plurality of individual terminals assigned to said block for simultaneous recording.

* * * * *